United States Patent [19]

Madsen

[11] Patent Number: 4,712,154
[45] Date of Patent: Dec. 8, 1987

[54] SHOCK PROTECTIVE CIRCUIT WITH MECHANICAL LATCH FOR SMALL APPLIANCES

[75] Inventor: Elmer W. Madsen, Bristol, Conn.
[73] Assignee: North American Philips Corporation, New York, N.Y.
[21] Appl. No.: 880,643
[22] Filed: Jun. 27, 1986

Related U.S. Application Data

[63] Continuation-in-part of Ser. No. 835,125, Feb. 28, 1986, abandoned.

[51] Int. Cl.[4] .............................................. H01H 47/12
[52] U.S. Cl. ................................... 361/178; 219/363; 307/326
[58] Field of Search ................... 361/178, 45, 46; 219/322, 363; 307/326

[56] References Cited
U.S. PATENT DOCUMENTS

| | | | |
|---|---|---|---|
| 4,103,319 | 7/1978 | Crain et al. | 361/178 |
| 4,219,857 | 8/1980 | Haraldsson et al. | 361/42 |
| 4,270,158 | 5/1981 | Gilardoni et al. | 361/178 |
| 4,345,289 | 8/1982 | Howell | 361/45 |
| 4,493,975 | 1/1985 | Yamamoto | 219/370 |
| 4,598,331 | 7/1986 | Legatti | 361/45 |

*Primary Examiner*—L. T. Hix
*Assistant Examiner*—David M. Gray
*Attorney, Agent, or Firm*—Jack E. Haken; James J. Cannon, Jr.

[57] ABSTRACT

A shock protection circuit utilizing an immersion detection current interrupter for use in small electrical appliances wherein the combination of a solenoid or a relay plus a sensor will cause an interruption of the power leads of a small appliance and the mechanical latching of the relay or solenoid contacts in an open position when the presence of an electrically conductive fluid is detected. In one embodiment, the sensor remains conductive at a safe level, while in a second embodiment power to the sensor is also interrupted. Both embodiments are immune to electrical noise.

17 Claims, 5 Drawing Figures

SHOCK PROTECTIVE CIRCUIT WITH MECHANICAL LATCH FOR SMALL APPLIANCES

This is a continuation-in-part of application Ser. No. 835,125, filed Feb. 28, 1986, now abandoned.

CROSS-REFERENCE TO RELATED APPLICATION

This application is related to an application entitled SHOCK PROTECTIVE CIRCUIT WITH ELECTRICAL LATCH FOR SMALL APPLIANCES, Ser. No. 835,127 filed Feb. 28, 1986 by the same inventor.

BACKGROUND OF THE INVENTION

1. Field of the Invention

The invention pertains to the field of shock protection circuits in general and in particular to immersion detection current interrupter circuits designed to protect the user of a small hand-held electrical appliance from a serious electrical shock if the appliance is immersed in or otherwise comes into contact with an electrically conductive fluid.

2. Description of the Prior Art

Shock protective circuits known in the prior art are of two types, ground fault current interrupter circuits (GFCI) and immersion detection current interrupter circuits (IDCI). Various devices incorporating such circuits are also known in the prior art. GFCI devices are presently required in new electrical installations in bathrooms and other locations. Typically, such devices are included in an assembly connected to an electrical outlet.

Prior art shock protection circuits are designed primarily for electrical devices of substantial size and cost. They tend to be sophisticated, complex devices which, while of substantial economic and safety value, are not appropriate for the volume and variety of inexpensive consumer products in the field of hand-held small electrical appliances. Typical of the prior patent art is the ground fault current interrupting device disclosed in U.S. Pat. No. 4,345,289 for use in residential applications. A typical industrial hazard protection device is disclosed in U.S. Pat. No. 4,103,319. Such devices are inappropriate in terms of size, complexity and cost of small consumer appliances.

Shock protection is presently required for wall-mounted hair dryers under UL 859, which is presently a limited standard of dubious value. The closest specific prior art patent is U.S. Pat. No. 4,493,975 which discloses a wall-mounted hand-held hair dryer. The principal power switch for the appliance is contained in the wall-mounted housing. When the appliance is removed from the wall mount, this switch is in the "off" position and no power flows to the appliance. Thus, if the appliance should accidentally or intentionally be immersed in a conductive fluid, it is electrically dead and no shock hazard is present. It thus satisfies the present UL standard 859. To turn on power to the appliance, the user must activate a switch in the wall mount. Simply returning the hand held dryer to the wall mount turns the switch off. The problem with this prior art device and the UL standard itself is that there is no protection from electrical shock when the power switch is in the "on" position.

Simple, reliable, inexpensive shock protection circuits incorporated in components small enough to be used in hand-held personal care appliances such as hair dryers and curling irons, and similar consumer appliances and tools, which serve to protect the user of a small electrical appliance from electrical shock if the appliance comes into contact with an electrically conductive fluid such as water, are not disclosed in the prior patent art nor are such devices commercially available. The most frequent hazard of this type is the use of hair dryers in a bathroom. When a personal care appliance such as a hair dryer or electric razor come into contact with water, the user may receive an electrical shock which can be fatal. The object of the present invention is to protect the user from a serious shock (above 0.005 amps) while meeting, or exceeding, the requirements of UL 859, paragraph 28.1, and equivalent standards either now in force or to be in force in the near future.

SUMMARY OF THE INVENTION

The present invention is a simple, reliable, inexpensive immersion detection current interrupter circuit to provide shock protection when a hand-held small appliance comes into electrical contact with an electrically conductive fluid such as water, said circuit designed to be packaged as a small component for inclusion within such an appliance or the plug of cord. When the appliance is plugged into an electrical power source such as a wall outlet and is immersed in or otherwise comes into electrical contact with a conductive fluid, there will be a current leakage. In the preferred embodiment, the circut utilizes a sensor to detect this leakage current. When a leakage current is detected over a certain threshold, a solenoid or relay breaks the load leads, causing the solenoid or relay to mechanically latch in an open position. After the solenoid or relay latches, no current will flow to be appliance.

For any specific appliance, a sensor wire is disposed within the housing and in proximity to the two power wires within the appliance. The sensor is connected through a solenoid or relay and a pair of diodes to the load leads. When the appliance is connected to (plugged into) a power source and the sensor wire comes into contact with a conductive fluid, the sensor wire provides a short path to ground with low resistance for the solenoid or relay current. Any current on the sensor wire above a threshold causes the solenoid or relay to operate, disconnecting the power leads, and a mechanical latch in the form of a release opens the normally closed solenoid contacts and allows them to stay open. Alternatively, a mechanical latch may be used to hold the relay contacts open. In the preferred embodiment, the power lines are opened between the power source and the current interrupter. The relay or solenoid may require more than 0.005 amps to pull in, but the leakage current will be interrupted in less than 0.025 seconds, meeting the standard of less than 5 mA maximum after 0.025 seconds. The sensor latches the solenoid or relay contacts whether the ac line is high or low. In an alternate embodiment, when the relay contacts mechanically latch, the coil keeps a low current on the sensor no matter how the plug is put in an outlet (normal or reversed polarity). If current flows through the sensor wire, it is limited to a safe value by design of the relay coil in the first embodiment.

In another embodiment with a mechanical latch, a capacitor in parallel with the relay is also connected to the sensor. When the sensor conductor detects a leakage current, current flows through the relay and at the same time charges the capacitor. When the current reaches a threshold level required to operate the coil, the relay contacts will open and current will continue to flow from the capacitor to allow the contacts to mechanically latch open, disconnecting the load lines before the relay. The relay contacts will remain latched until the contacts are mechanically reset. Once the contacts have latched, no current will flow to the appliance. In this embodiment the current is not limited to 0.005 amps since, when the contacts are open, the coil is no longer conducting.

The object of the invention is to provide a simple, reliable, inexpensive shock prevention circuit which will limit the maximum current leakage to 0.005 amps after 0.025 seconds. Used in conjunction with a leakage sensor, the relay (or solenoid) and mechanical latch circuit of the present invention achieves this object.

DESCRIPTION OF THE PREFERRED EMBODIMENT

The shock protection device of the present invention is a simple, reliable, inexpensive immersion detection current interrupter circuit which addresses the hazard of possible severe, even fatal, electrical shock to a person if a hand-supported appliance is dropped into a conductive fluid such as water. Since non-distilled water is a conductive fluid and the hand-held hair dryer is the small appliance most frequently used in close proximity to water, resulting in statistically significant injuries especially among children, the present invention will be described in an embodiment useful in said hair dryers. It is to be understood that the invention is not limited thereto.

Figure 1:
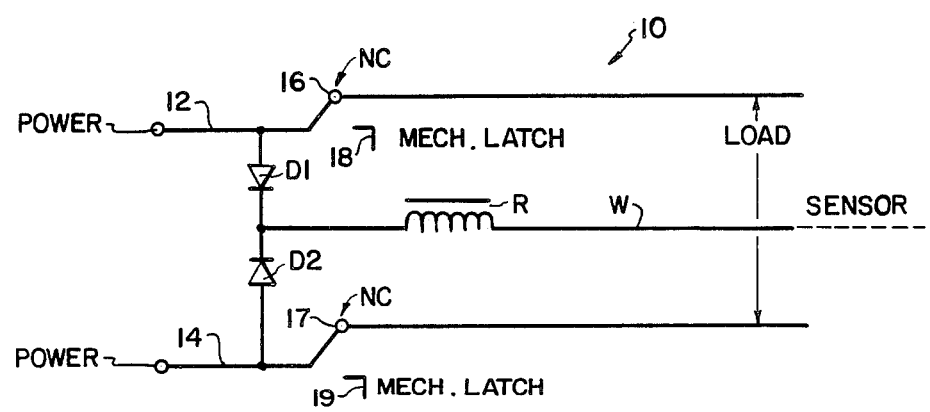
FIG. 1 is a circuit diagram for a first alternate embodiment of a simple immersion detection current interrupter circuit for small appliances using a mechanical latch, with the sensor always cnducting.

FIG. 1 is a circuit diagram of a first embodiment of the simple shock protection device 10 of the present invention. A special sensor conductor W in the form of at least one uninsulated (exposed) wire is positioned in various parts of the small appliance to sense leakage currents when the sensor wire comes into contact with a conductive fluid such as water. The sensor wire W is positioned so that it will conduct a leakage current over the shortest path to ground, either the external ground or the internal ground of the appliance. The sensor wire W is positioned at locations in the appliance where the water path to the ground would normally be shorter than the path from the hot lead to ground. It may also be in close proximity to one or both of the power leads 12, 14 or an additional ground wire. Thus, in some cases conduction may be between the sensor lead W and one of the power leads 12, 14, depending upon polarity. In some cases the sensor lead W would be placed as close as possible to the ground lead, thus making a shorter sensor current path when the appliance is placed under water. The precise positioning of the sensor lead W is critical to the effectiveness of the interrupter, and will depend on the configuration of the appliance in which it is installed. In any case it should be close to the power leads also.

A solenoid or two-pole double-throw relay R is connected via a pair of diodes D1, D2 between the two power leads 12, 14 through the sensor lead W to ground. When a path is provided between the sensor lead W and ground sufficient to cause the solenoid or relay R to activate, the relay contacts 16, 17 mechanically latch into an open position. Once latched, the power leads 12, 14 to the appliance are disconnected, but not the sensor lead W. The sensor W will cause the relay R to operate and a mechanical latch 18, 19 will hold the contacts open. The relay R will remain latched until it is mechanically reset. Once the relay or solenoid contacts 16, 17 have latched, the maximum current drawn by the sensor wire W to ground will be limited by the design of the coil. Typically the current will always be less than 0.005 amps. The diodes D1 and D2 maintain a dc current of less than 0.005 amps on the relay R until the unit is unplugged. However, they are not used to hold the contacts 16, 17 open.

Figure 2:
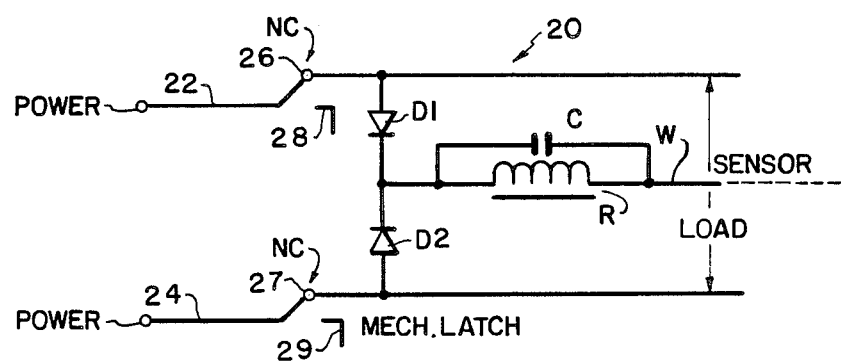
FIG. 2 is a circuit diagram of a second alternate embodiment of the circuit of FIG. 1 in which the sensor lead and all load leads to the appliance are opened.

In the alternate embodiment 20 illustrated in FIG. 2, the same sensor W and relay R or solenoid connections are present. However, this embodiment utilizes a mechanical latch 28, 29 which opens all leads 22, 24 and W to the appliance. The latch 28, 29 is placed between the power source and the diodes D1, D2. This embodiment also uses a capacitor C connected in parallel with the coil of a relay R. When a conductive fluid is detected, the sensor wire W causes a current both to flow through the relay coil R and to charge the capacitor C at the same time. When the current reaches the level required to operate the relay R, the relay contacts open and current flows from the capacitor C through the relay coil R allowing the contacts 26, 27 of the relay to mechanically latch open. After the contacts latch, no current flows to the appliance because all leads, including the sensor lead W, are disconnected.

Figure 5:
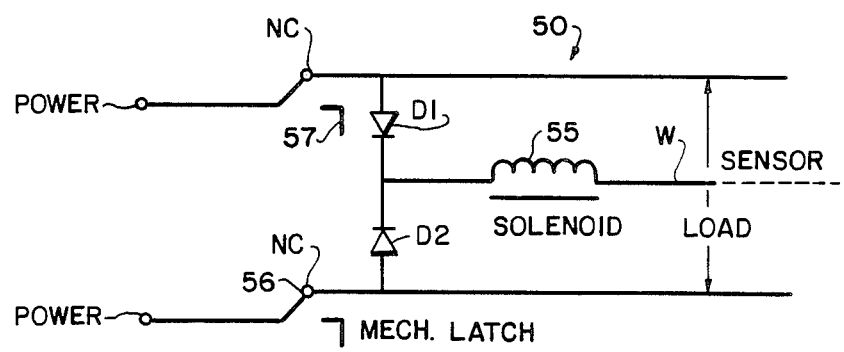
FIG. 5 is a circuit diagram of the preferred embodiment of the present invention.

FIG. 5 illustrates the preferred embodiment of the immersion detection current interrupter 50 of the present invention. The circuit of FIG. 5 is a variation of the circuit of FIG. 2. In FIG. 5, a solenoid 55 replaces the relay R of FIG. 2. This simplifies the latching of the circuit upon detection of a leakage current. The mechanical latch 57 may be in the form of a release to open the normally closed contacts 56 and allow them to stay open, or it may be a latch to hold the contacts 56 in the open position. In either case, the capacitor C of FIG. 2 is not needed.

The circuit of FIG. 5 is thus the simplest circuit with the minimum number of components needed to effect a current interrupter, thereby yielding a very reliable circuit which is very inexpensive to manufacture and hence appropriate for low cost small consumer appliances.

In all embodiments one or two relays or solenoids may be used.

The circuits of all embodiments are not easily resettable. The circuits may be reset by mechanically resetting the latch, which for safety reasons may require a special tool or opening the housing. Of course, the unit should be dry to be reset.

Figure 4:
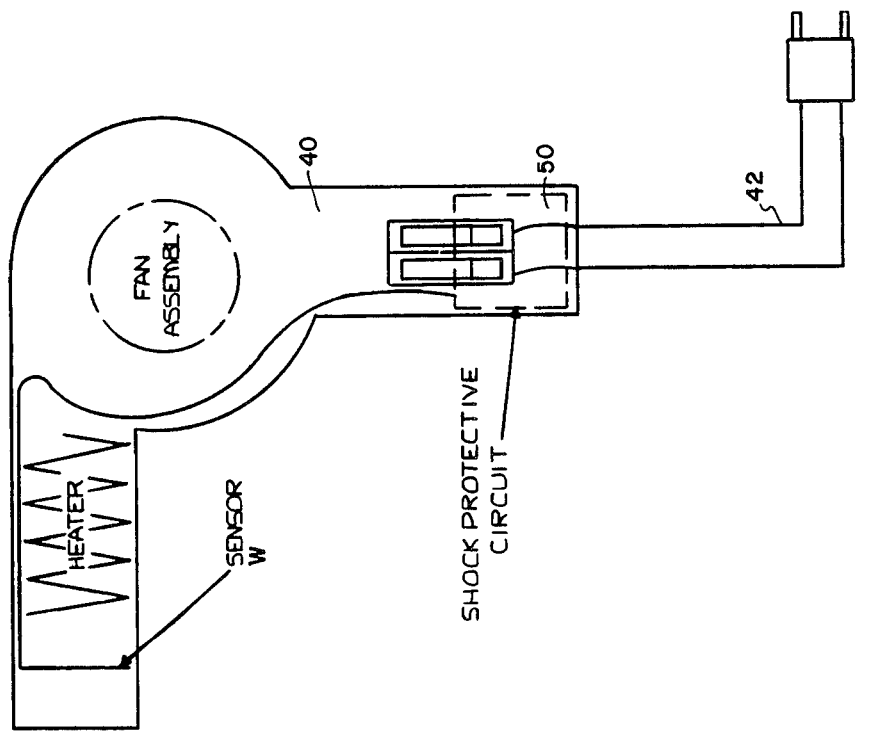
FIG. 4 is a cut-away plan view showing the circuit of FIG. 2 installed in the housing of a hand-held hair dryer.

The device of the present invention is a simple, reliable and inexpensive immersion detection current interrupter which can be incorporated within the housing 40 of a hand-held appliance as shown in FIG. 4, said circuit being used to disconnect power to the appliance via a relay or solenoid. The triggering current required to energize the relay must be kept about 5 mA. It may exceed this level but must drop within 0.025 seconds. This threshold level allows for leakage currents that are inherent in most electrical devices and minimizes false triggers. This current level may be achieved by the designing of the relay coil to the limiting value, as is necessary for the circuit of FIG. 1.

When a conductive fluid comes into contact with the or sensor W within the housing 40, current will flow through the fluid to ground, triggering the control circuit 50 to disconnect the appliance from the ac line. An additional feature of three immersion detector current interrupters 10, 20, 50 is that the protection is available to the user whether the hand supported appliance is switched off or on, that is, protection is available whenever the appliance is energized in the presence of a hazardous condition. This is the case for both embodiments.

Figure 3:
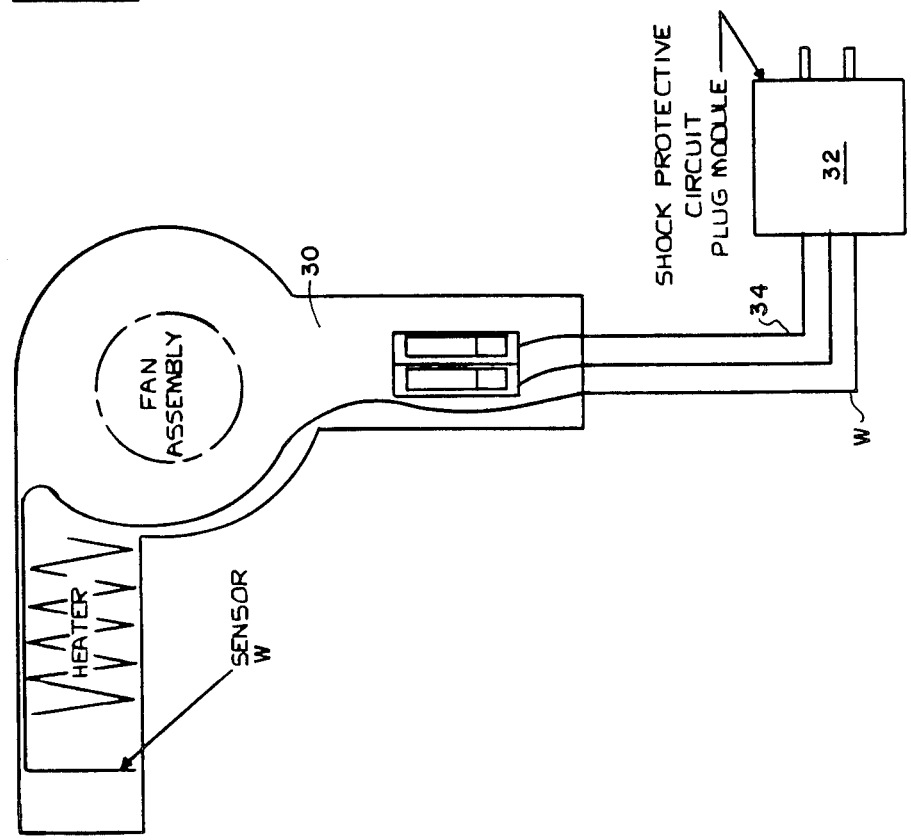
FIG. 3 is a cut-away plan view showing the circuit of FIG. 1 installed in the plug of a hand-held hair dryer.

The shock-protective current interrupter circuits 10, 20, 50 of FIGS. 1, 2 and 5 are designed for use with any small and/or handheld appliance which could come into contact with a conductive fluid, sch as an electrical drill, a toaster or a hair dryer. As stated earlier, the precise positioning of the sensor wire W will depend upon the configuration of the appliance in which the current interrupter is installed. Typically, the sensor lead should be positioned such that it would be the first electrical element of the appliance to some in contact with a conductive fluid such as water. FIGS. 3 and 4 illustrate typical placements of the current interrupter and the sensor wire in typical hair dryer housings 30, 40. In FIG. 3 the shock protective circuit of FIGS. 1, 2 and 5 is fabricated in a plug module 32. A three wire power cord 34 connects the plug module 32 to the appliance through housing 30. The third wire in the power cord 34 is the sensor wire W which is disposed about the housing 30, and in particular about the nozzle end such that the sensor wire W will be the first wire to touch a conductive fluid in case of an accident.

FIG. 4 shows a positioning of the shock protective circuit module 10, 20 or 50 within the handle of a typical hair dryer housing 40. In this embodiment, only a two wire power cord 42 is required. The sensor wire W originates at the shock protective module 50 and is disposed through the housing 40 in the same manner as in FIG. 3. It should be noted that in both figures the shock protective circuit is positioned between the plug connection to the power souce and the load.

The circuits of FIGS. 1, 2 and 5 can be incorporated within the housing 40 of a small appliance as shown in FIG. 4, in which case only a two-wire power cord 42 is required. Alternatively, the circuits could be incorporated within the power plug 32 as shown in FIG. 3, in which case a three-wire cord 32 is required, the third wire being the sensor lead W. This sensor lead W outside the appliance housing could be a wire mesh around the power leads, or a bare wire with a loose porous sleeve around one or both of the power leads. Within the appliance, the sensor W could be a conductive strip, a conductive coating or a ring. The sensor could be one or more wires, at least one of which is in close proximity to the power leads or an additional ground wire. In certain cases, conduction may be between a sensor lead and one of the power leads, depending on polarity of the leads. In any event, the sensor should be close to the power lines to provide a good path for conduction in water.

In the embodiments illustrated, the diodes are drawn for a particular current direction. It should be obvious that the diodes could be reversed so that current will flow in the opposite direction.

The circuits of FIGS. 1, 2 and 5 both operate independently of the polarity of the power lines. The AC line plug could be reversed without affecting their operation.

Most importantly, the circuits of FIGS. 1, 2 and 5 are immune to electrical noise and will not false trigger or nuisance trigger.

While the present UL 859 standard requires a shock protective circuit only when the appliance power switch is in the "off" position, it is anticipated that this requirement will be extended to cover the "on" position of the switch. In any event, the circuits of the present invention work with the power switch in either position. The shock protection is available any time the unit is energized.

The advantage of the embodiments of the present invention is that they provide the lowest possible cost and fewest components for a shock protection circuit which is fast and reliable but not easily or accidentally resettable. In the first embodiment, after latching, the current in the sensor is limited to safe levels until the appliance is unplugged. In the second, all leads are broken. Furthermore, if either shock protection circuit is placed in the appliance plug, no components of the appliance are required to be sealed.

A further advantage of the three embodiments is that each embodiment will operate even if one of the two power leads should be broken or interrupted. Such a break can happen through excessive flexing or other abuse of the power cord of a small appliance.

What is claimed is:

1. A simple and reliable shock protection circuit for use within small, hand-held electrical appliances having at least a two wire power cord and a housing comprising:

an electrical connection with two opposed diodes positioned between the two power wires of a small electrical appliance said connection being between a plug connection for a power source and a load;

conductive sensor means within the housing of said appliance and connected to said electrical connection between said opposed diodes to detect the presence of a leakage current within said appliance when said appliance comes into contact with a conductive fluid and to conduct said current to ground;

said sensor means being positioned within said housing such that said sensor means is the first electrical element of said appliance to come into contact with said conductive fluid;

circuit opening means connected to said sensor means and to said electrical connection between said opposed diodes to interrupt said power wires when a leakage current above a threshold limit is detected;

means to latch said power wires in an open state when interrupted; and means to limit the current through said sensor means to a safe level below said threshold limit and to maintain said latch in its open state.

2. The circuit of claim 1 wherein said sensor means is at least one wire positioned within said housing and in close proximity to said power leads to provide the shortest path to ground.

3. The circuit of claim 1 wherein said means to interrupt said power leads is a solenoid.

4. The circuit of claim 1 wherein said means to interrupt said power leads is a relay.

5. The circuit of claim 1 wherein said means to latch is positioned between said electrical connection of said diodes and said means to interrupt.

6. The circuit of claim 5 wherein said means to latch further includes a capacitor which is charged by said sensor lead to the threshold.

7. The circuit of claim 5 wherein said means to limit the current through said sensor means is an electrical disconnection of said sensor lead.

8. The circuit of claim 1 wherein said means to latch is connected to said power wire between said plug connection to a power source and said electrical connection of said diodes.

9. The circuit of claims 1 or 5 in which said means to latch is a mechanical latch.

10. The circuit of claim 1 in which the means to limit the current through said sensor is the resistance through a relay coil.

11. A shock protection circuit for use with an electrical appliance having a housing and at least a two wire power cord with a plug, for connection of a load to a power source comprising:
an electrical connection with two opposed diodes between said two power wires, said connection being between said connecting plug for a power source and said load;
conductive sensor means within said housing of said appliance such that said sensor means is the first electrical element of said appliance to come into contact with a conductive fluid to detect the presence of a leakage current within said appliance;
said sensor means conducting said leakage current to ground;
threshold means having a first connection between the diodes of said electrical connection and a second connection to said sensor means, such that when the current in said sensor means exceeds a predetermined threshold, said threshold means is activated;
circuit opening means responsive to said threshold means to interrupt the current in each of said power wires;
latch means to maintain said interrupt means in an open position when said threshold means is activated.

12. The circuit of claim 11 wherein said sensor means is at least one wire positioned within the housing of said appliance and in close proximity to said power wires to provide the shortest path to ground for a leakage current.

13. The circuit of claim 11 wherein said threshold means is a solenoid.

14. The circuit of claim 11 wherein said means to latch is a release to open a normally closed contact.

15. The circuit of claim 11 wherein said means to latch is a retaining means to hold contacts in an open position.

16. The circuit of claim 11 wherein said means to latch is positioned between said power source and said electrical connection of said diodes.

17. The circuit of claim 11 wherein said interrupt means is a normally closed switch in each of said power wires.

* * * * *